(12) United States Patent
Nimon et al.

(10) Patent No.: US 6,225,002 B1
(45) Date of Patent: May 1, 2001

(54) DIOXOLANE AS A PROCTECTOR FOR LITHIUM ELECTRODES

(75) Inventors: Yevgeniy S. Nimon, Walnut Creek; Steven J. Visco, Berkeley; May-Ying Chu, Oakland, all of CA (US)

(73) Assignee: PolyPlus Battery Company, Inc., Berkeley, CA (US)

(*) Notice: Subject to any disclaimer, the term of this patent is extended or adjusted under 35 U.S.C. 154(b) by 0 days.

(21) Appl. No.: 09/245,167

(22) Filed: Feb. 5, 1999

(51) Int. Cl.$^7$ .............................. H07M 4/04; H07M 10/40
(52) U.S. Cl. ..................... 429/212; 429/303; 429/307; 429/329; 29/623.5
(58) Field of Search ................................. 429/303, 307, 429/329, 212; 29/623.5

(56) References Cited

U.S. PATENT DOCUMENTS

| | | | |
|---|---|---|---|
| 3,947,289 | * 3/1976 | Dey et al. ...................... | 429/329 X |
| 4,410,609 | 10/1983 | Peled et al. . | |
| 5,691,083 | * 11/1997 | Bolster ........................... | 429/329 X |
| 6,017,651 | * 1/2000 | Nimon et al. .................. | 429/303 X |
| 6,030,720 | * 2/2000 | Chu et al. ....................... | 429/329 |

FOREIGN PATENT DOCUMENTS

| | | |
|---|---|---|
| 0689260 | 12/1995 | (EP) . |
| 2311410 | 9/1997 | (GB) . |

OTHER PUBLICATIONS

E. Peled, "Rechargeable Lithium–Sulfur Battery (Extended Abstract)," *Journal of Power Sources*, v. 26, pp. 269–271 (1989) (Month Unknown).

E. Peled, "Lithium–Sulfur Battery: Evaluation of Dioxolane–Based Electrolytes," *Electrochemical Society*, v. 136, No. 6, pp. 1621–1625 (1989) (Jun.).

* cited by examiner

*Primary Examiner*—Stephen Kalafut
(74) *Attorney, Agent, or Firm*—Beyer, Weaver & Thomas, LLP

(57) ABSTRACT

Disclosed are dioxolane-treated lithium electrodes, battery cells containing such dioxolane-treated lithium electrodes, battery cell electrolytes containing dioxolane, and methods of treating lithium electrodes with dioxolane and battery cells containing such dioxolane-treated lithium electrodes. Treating lithium with dioxolane prevents the lithium from reacting with a wide range of substances which can contaminate battery cells, particularly moisture and other protic impurities, that might otherwise react with the lithium to the detriment of its function as a negative electrode in a battery cell. Battery cells containing dioxolane as an electrolyte co-solvent in accordance with the present invention exhibit improved cycling performance over cells not containing dioxolane. Moreover, the dioxolane treatment does not negatively impact sulfur utilization and improves the lithium's electrochemical function as the negative electrode in the battery cell.

38 Claims, 14 Drawing Sheets

DIOXOLANE AS A PROCTECTOR FOR LITHIUM ELECTRODES

BACKGROUND OF THE INVENTION

This invention relates generally to lithium-sulfur batteries, and in particular to lithium electrodes having protective dioxolane coatings.

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for rechargeable batteries having high specific energies (light weight). At the same time, mounting concerns regarding the environmental impact of throwaway technologies, has caused a discernible shift away from primary batteries and towards rechargeable systems.

In addition, heightened awareness concerning toxic waste has motivated, in part, efforts to replace toxic cadmium electrodes in nickel/cadmium batteries with the more benign hydrogen storage electrodes in nickel/metal hydride cells. For the above reasons, there is a strong market potential for environmentally benign secondary battery technologies.

Secondary batteries are in widespread use in modern society, particularly in applications where large amounts of energy are not required. However, it is desirable to use batteries in applications requiring considerable power, and much effort has been expended in developing batteries suitable for high specific energy, medium power applications, such as, for electric vehicles and load leveling. Of course, such batteries are also suitable for use in lower power applications such as cameras or portable recording devices.

At this time, the most common secondary batteries are probably the lead-acid batteries used in automobiles. These batteries have the advantage of being capable of operating for many charge cycles without significant loss of performance. However, such batteries have a low energy to weight ratio. Similar limitations are found in most other systems, such as Ni—Cd and nickel metal hydride systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

Thus, a smaller, lighter, cheaper, non-toxic battery has been sought for the next generation of batteries. The low equivalent weight of lithium renders it attractive as a battery electrode component for improving weight ratios. Lithium provides also greater energy per volume than do the traditional battery standards, nickel and cadmium.

The low equivalent weight and low cost of sulfur and its nontoxicity renders it also an attractive candidate battery component. Successful lithium/organosulfur battery cells are known. (See, De Jonghe et al., U.S. Pat. Nos. 4,833,048 and 4,917,974; and Visco et al., U.S. Pat. No. 5,162,175.)

Recent developments in ambient-temperature sulfur electrode technology may provide commercially viable rechargeable lithium-sulfur batteries. Chu and colleagues are largely responsible for these developments which are described in U.S. Pat. Nos. 5,582,623 and 5,523,179 (issued to Chu). The patents disclose a sulfur-based positive electrode for a battery cell that has low equivalent weight and high cell voltage and consequently a high specific energy (greater than about 120 Wh/kg). The disclosed positive electrode addresses deficiencies in the prior art to provide a high capacity sulfur-based positive composite electrode suitable for use with metal (such as lithium) negative electrodes in secondary battery cells. These developments allow electrochemical utilization of elemental sulfur at levels of 50% and higher over multiple cycles. Because sulfur has a theoretical maximum capacity of 1675 mAh/g (assuming all sulfur atoms in an electrode are fully reduced during discharge), the utilization of sulfur in lithium-sulfur cells as described in the above Chu patents typically exceeds 800 milliamp-hours per gram (mAh/g) of sulfur.

The lithium-sulfur batteries described in the above Chu patents provide increased capacity (have a high specific energy) relative to previously available battery cells, such as the above-noted lead-acid batteries. However, like previous battery designs, they are susceptible to the reaction of the lithium electrode with the electrolyte and/or dissolved sulfur species. This leads to several problems including low cycling efficiency of lithium and the possibility of "pillowing". Low cycling efficiency of lithium is problematic in that it necessitates the use of excess lithium in the cell to make up for that is lost on each cycle. This adds weight and volume to the cell that it undesirable. Lithium-sulfur battery cells are typically composed of lithium and sulfur electrodes and an electrolyte (liquid, gel or solid) sealed in a casing. Pillowing occurs when gas is produced as a result of a chemical reaction within the cell. The increased volume occupied by such a gas relative to the solid and/or liquid phase battery cell components from which it is derived increases the pressure within the sealed casing, causing it to bulge, or "pillow."

An example of this situation is illustrated in FIGS. 1A and 1B. The figures show representations of a lithium-sulfur secondary battery cell 100. The cell's electrodes and electrolyte are sealed within a flexible pouch-like casing 102. In a normal cell which functions properly, illustrated in FIG. 1A, the casing 102 roughly conforms to its contents. FIG. 1B shows a representation of the battery cell 100 after it has pillowed. As noted above, the pillowed cell results from a build up of pressure within the casing 102 due to unintended and undesirable gas formation within the casing 102. The casing of a pillowed cell no longer roughly conforms to its contents, but instead bulges outward.

Pillowing is undesirable in battery cells for a number of reasons. First, pillowing suggests an unintended reaction within the cell that is likely to detrimentally impact its performance. Second, the deformation of the cell due to pillowing, particularly its increase in size, may result in the cell no longer fitting in its allotted compartment in the electronic device which it is intended to power. Thirdly, the increased internal pressure which causes pillowing may cause the casing of the cell to burst, allowing access of contaminants into the cell, and escape of lithium and other potentially dangerous battery cell components from the cell. Pillowing is typically observed in secondary battery cells, however it may also occur in primary battery cells with similar detrimental consequences.

Accordingly, lithium-sulfur battery cell designs which mitigate pillowing would thus be desirable.

SUMMARY OF THE INVENTION

The present invention provides dioxolane-treated lithium electrodes, battery cells containing such dioxolane-treated lithium electrodes, battery cell electrolytes containing dioxolane, and methods of treating lithium electrodes with dioxolane and battery cells containing such dioxolane-treated lithium electrodes. Treating lithium with dioxolane prevents the lithium from reacting with a wide range of substances which can contaminate battery cells, particularly moisture and other protic impurities, that might otherwise react with the lithium to the detriment of its function as a negative electrode in a battery cell. Battery cells containing dioxolane as an electrolyte co-solvent in accordance with the present invention exhibit improved cycling performance over cells not containing dioxolane. Moreover, the dioxolane treatment does not negatively impact sulfur utilization and improves the lithium's electrochemical function as the negative electrode in the battery cell.

In one aspect, the present invention provides a battery cell electrolyte including a main solvent of an electrolyte solvent mixture. The main solvent has the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups. The electrolyte solvent mixture also includes a co-solvent, which makes up no more than about 30% by volume of the electrolyte solvent mixture, and includes dioxolane. The electrolyte may also include an additional co-solvent having a donor number of at least about 13.

In another aspect, the present invention provides a negative electrode including a lithium material and a film coating the lithium material. The film is formed by treating the lithium material with dioxolane prior to incorporation of the electrode into a battery cell.

In another aspect, the present invention provides a battery cell including a negative lithium electrode, a positive electrode including an electrochemically active material, and an electrolyte. The electrolyte includes a main solvent of an electrolyte solvent mixture. The main solvent has the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups. The electrolyte solvent mixture also includes a co-solvent, which makes up no more than about 30% by volume of the electrolyte solvent mixture, and includes dioxolane. The electrolyte may also include an additional co-solvent having a donor number of at least about 13. In a preferred embodiment, the battery cell may have a sulfur-based positive electrode, or a sulfur-containing catholyte.

In still another aspect, the invention provides a method of making a protected lithium electrode battery cell. The method involves treating a lithium material with dioxolane to form a negative electrode having a protective film, forming a positive electrode, and combining the negative and positive electrodes with an electrolyte following the treating of the lithium material.

These and other features of the invention will further described and exemplified in the drawings and detailed description below.

DETAILED DESCRIPTION OF PREFERRED EMBODIMENTS

Figure 1A:
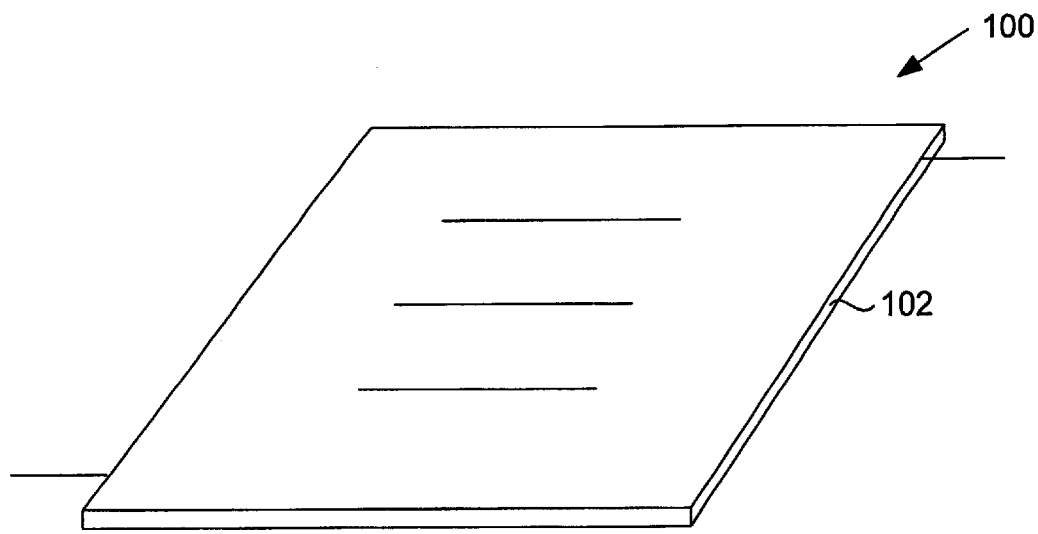
FIGS. 1A and 1B illustrate the problem of pillowing in a conventional battery cell.
Figure 1B:
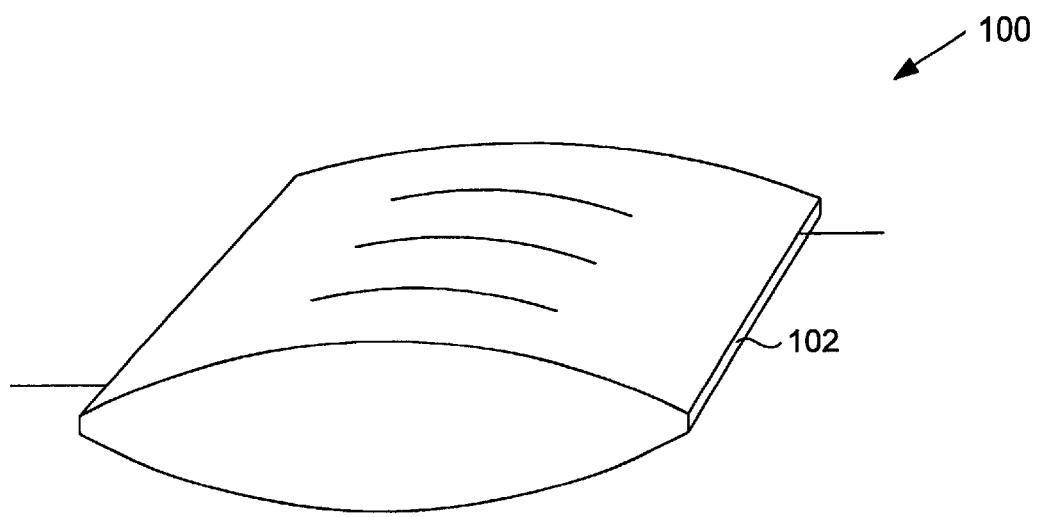

Reference will now be made in detail to preferred embodiments of the invention. Examples of preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The present invention provides dioxolane-treated lithium electrodes, battery cells containing such dioxolane-treated lithium electrodes, battery cell electrolytes containing dioxolane, and methods of treating lithium electrodes with dioxolane and battery cells containing such dioxolane-treated lithium electrodes. Treating lithium with dioxolane prevents the lithium from reacting with a wide range of substances which can contaminate battery cells, particularly moisture and other protic impurities, that might otherwise react with the lithium to the detriment of its function as a negative electrode in a battery cell. Dioxolane treatment also prevents undesirable reaction of electrolyte solvents and sulfur species, such as dimethoxyethane (DME) and $Li_2S_x$, with the surface of the lithium electrode. Such reactions may produce gaseous products that can lead to a significant increase in cell internal pressure causing pillowing. In addition to, and likely as a consequence of, being resistant to pillowing, battery cells containing dioxolane as an electrolyte co-solvent in accordance with the present invention exhibit improved cycling performance over cells not containing dioxolane. Moreover, the dioxolane treatment does not negatively impact sulfur utilization and improves the lithium's electrochemical function as the negative electrode in the battery cell.

While not wishing to be bound by any particular theory, it is believed that the dioxolane treatment produces a protective (or "passivating") film with high Li-ion conductivity at the surface of the lithium electrode. It is further believed that this film results from a polymerization of dioxolane at the surface of the lithium.

In addition, dioxolane may be advantageously used as a co-solvent in lithium battery cell electrolytes. When used in certain amounts, preferably no more than about 30% by volume of the electrolyte solvent mixture, more preferably about 5–15% by volume of the electrolyte solvent mixture, most preferably about 10% by volume of the electrolyte solvent mixture, dioxolane can provide in situ protection of the lithium electrode without negatively impacting sulfur utilization while improving lithium electrode cycling efficiency.

The use of dioxolane as a component in battery cell electrolytes has been proposed previously. Dan et al. (UK Pat. Application No. GB 2 311 410 A) discloses the use of an electrolyte constituted of dioxolane, a lithium salt, and a tertiary amine polymerization inhibitor as a safety feature in a battery cell. According to Dan, this dioxolane-based electrolyte polymerizes in the cells described in the '410 application at temperatures above about 100° C. or voltages above about 4 V (conditions typically resulting from cell overcharge at high current or a short circuit) in order to prevent hazardous reactions between the lithium of the negative electrode and the electrolyte. This polymerization substantially increases the resistivity of the cell and effectively terminates its operation safely. This work does not address cells containing sulfur species.

Yamin et al. (European Patent Application No. 95303750.4) discloses a dioxolane-based electrolyte (1 M $LiAsF_6$ or $LiBF_4$ in a mixture of 1–3 dioxolane and tetrahydrofuran (TEF)) in a cell in which an alkali metal is incorporated into an alkali metal-free anode. The anode is composed of a thin, conductive anode support film, for example made of copper, on the surface of which an alkali metal, preferably lithium, is plated in situ during charging of the cell. Like Dan et al., Yamin et al. does not address cells containing sulfur species.

Peled et al. (U.S. Pat. No. 4,410,609) lists dioxolane among a number of electrolyte solvents useful for slowing the corrosion of a lithium or sodium anode in a primary battery cell in order to improve shelf life. The '609 patent discloses the use of a electrolyte solvents that limit the solubility of polysulfide species in order to lower the corrosion rate due to the reaction of polysulfides with the anode, and to increase the ionic conductivity of the polysulfide electrolyte solution. Peled discloses that the solvent is preferably selected from among a number of ethers, including dioxolane. In the only example in the patent citing the use of dioxolane as an electrolyte component, dioxolane was used in a 1:1:1 ratio with toluene and THF (33% of each).

In other publications (E. Peled, Y. Sternberg, A. Gorenshtein, and Y. Lavi, *Lithium-Sulfur Battery: Evaluation of Dioxolane-Based Electrolytes*, J. Electrochem. Soc. Vol. 136, No. 6, 1621–24 (1989); E. Peled, A. Gorenshtein, M. Segal, and Y. Sternberg, *Rechargeable Lithium-Sulfur Battery* (Extended Abstract), J. of Power Sources, 26, 269–271 (1989)), Peled et al. provide additional disclosures concerning dioxolane-based electrolytes. In these publications, the use of battery cell electrolytes containing dioxolane is disclosed. Dioxolane was added to toluene/THF solvent mixtures in an attempt to improve conductivity. The dioxolane-based electrolytes, containing at least 60% dioxolane, did provide increased rate capability, but also resulted in markedly reduced sulfur utilization, even at low discharge rates.

Electrolytes

In a preferred embodiment, the main electrolyte solvent of this invention includes one or more compounds having an ether linkage. They have the general formula $R_1(CH_2CH_2O)_nR_2$, where n ranges between 1 and 10 and $R_1$ and $R_2$ are different or identical alkyl or alkoxy groups (including substituted alkyl or alkoxy groups). Alternatively, as described in commonly-assigned, co-pending patent application Ser. No. 08/948,969, now U.S. Pat. No. 6,030,720 which is incorporated by reference herein, $R_1$ and $R_2$ may together form a closed ring to form a crown ether for example. Examples of linear solvents include the glymes $(CH_3O(CH_2CH_2O)_nCH_3)$ and related oxides of the formula $(CH_2CH_2O)_n(CH_2O)_p$, where p ranges from about 1 to 50. Such ethoxy repeating unit compounds serve as lithium ion coordinating solvents. In a preferred embodiment, the main solvent is dimethoxyethane (DME or glyme), the simplest glyme having a value of n equal to 1 ($CH_3O(CH_2CH_2O)CH_3$).

An electrolyte in accordance with a preferred embodiment of the present invention also includes a co-solvent of dioxolane, preferably 1,3-dioxolane. The dioxolane co-solvent makes up no more than about 30% by volume of the electrolyte solvent mixture, more preferably about 5–15% by volume of the electrolyte solvent mixture, most preferably about 10% by volume of the electrolyte solvent mixture. In general, the liquid electrolyte solvent mixtures of this invention include about 50 to 95% by volume of the main solvent and about by volume of the dioxolane co-solvent. The balance will be one or more of the additional co-solvents listed below.

While the electrolyte solvents described above are the main components of the electrolytes in accordance with this invention, one or more additional co-solvents may be provided with them. If such co-solvents are employed, they are preferably chosen to solvate lithium cations or sulfide/polysulfide anions. In certain preferred embodiments, donor or acceptor co-solvents may be employed.

Examples of other general classes of co-solvents are donor solvents which tend to solvate cations and acceptor solvents which tend to solvate anions. Donor solvents are characterized by high donor numbers, preferably at least about 13. The resistance to chemical reactivity conferred on lithium electrodes by dioxolane treatment (pretreatment or in situ) allows for the use of such high donor number co-solvents which improve positive sulfur electrode performance but normally would attack the lithium electrode. A desirable property of both donor and acceptor co-solvents used in this invention is a high dielectric constants, $\epsilon$. Such solvents generally promote dissociation of an ionic solute or a contact ion-pair.

Generally, donor solvents are those solvents which can be characterized as Lewis bases (they may be aprotic solvents). Generally, these solvents are good at solvating cations such as lithium ions. Donor solvents promote the ionization of covalent compounds to form intimate (or contact) ion-pairs. The concept of a solvent donor number is further explained and exemplified in "Experimental Electrochemistry for Chemists," by Sawyer and Roberts, Jr., John Wiley & Sons, New York (1995). That reference is incorporated herein by reference for all purposes.

Suitable donor co-solvents include hexamethylphosphoramide (HMPA), pyridine, N,N-diethylacetamide, N,N-diethylformamide, dimethylsulfoxide (DMSO), tetramethylurea, N,N-dimethylacetamide, N,N-dimethylformamide (DMF), tributylphosphate, trimethylphosphate, N,N,N',N'-tetraethylsulfamide, tetramethylenediamine, tetramethylpropylenediamine, and pentamethyldiethylenetriamine. These assist in solvation of lithium ions.

Suitable acceptor solvents assist in solvation of the sulfide and polysulfide anions. Acceptor solvents are those solvents which can be characterized as Lewis acids (they may be protic or aprotic solvents) and promote solvation of anions. Examples include alcohols such as methanol, glycols such as ethylene glycol, and polyglycols such as polyethylene glycol, as well as nitromethane, trifluoroacetic acid, trifluoromethanesulfonic acid, sulfur dioxide, and boron trifluoride.

It should be understood that the electrolyte solvents of this invention may also include other co-solvents which do not necessary fall into the donor solvent and acceptor solvent classes. Examples of such additional co-solvents include sulfolane, dimethyl sulfone, dialkyl carbonates, tetrahydrofuran (THF), propylene carbonate (PC), ethylene carbonate (EC), dimethyl carbonate (DMC), butyrolactone, N-methylpyrrolidinone, 1,3-dimethyl-2-imidizolidinone, and combinations of such liquids.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, $LiAsF_6$. As indicated above, the electrolyte salt is optional for the battery cells of this invention, in that upon discharge of the battery, the metal sulfides or polysulfides formed can act as electrolyte salts. An electrolyte solution containing dissolved cathode material, for example in the form of electrolyte salts, may be referred to as a catholyte.

Lithium electrodes and the electrolytes in accordance with the present invention are preferably combined with a sulfur-based positive electrode in battery cells. Regardless of whether the sulfur is present in a solid phase, the battery cells of this invention preferably operate with their electrolytes at a concentration of between about 3 and 30 molar sulfur, more preferably between about 4 and 20 molar sulfur, and most preferably between about 5 and 10 molar sulfur. The sulfur used in this measure is the sulfur atoms in electroactive species. Thus, for example, one molar $Li_2S$ corresponds to one molar sulfur, whereas one molar $Li_2S_5$ corresponds to five molar sulfur, and one molar $S_8$ corresponds to eight molar sulfur.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. As mentioned above, such separators are described in U.S. Pat. No. 3,351,495 assigned to W. R. Grace & Co. and U.S. Pat. Nos. 5,460,904, 5,540,741, and 5,607,485 all assigned to Bellcore, for example.

The battery cells of this invention may also include a gel-state or a solid-state electrolyte, particularly where the lithium electrode is pretreated with dioxolane. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide. In addition, the electrolyte separator could contains less than 20% (weight percentage) of an a dioxolane-containing liquid electrolyte, such as described above.

In the gel-state, the electrolyte separator contains at least 20% (weight percentage) of an organic liquid (see the above listed dioxolane-containing liquid electrolyte compositions for examples), with the liquid being immobilized by the inclusion of a gelling agent. Many gelling agents such as polyacrylonitrile, PVDF, or PEO can be used.

In addition, dioxolane electrolytes in accordance with the present invention may be used to supplement the protection afforded to glass-coated electrodes, such as described in commonly-assigned co-pending application Ser. No. 09/139,601. In the case of lithium electrodes coated with a protective glass layer, the dioxolane co-solvent of an electrolyte in accordance with the present invention may effectively heal cracks which form in the glass during cycling by penetrating the cracks and contacting the lithium to form a protective coating.

Dioxolane Treatment of Lithium Electrodes

Treatment of lithium electrode with dioxolane may be by coating with dioxolane prior to incorporation into a battery cell (pretreatment), or may occur in situ following incorporation into a battery cell upon contact with a dioxolane co-solvent in the cell's electrolyte. Pretreatment may be conducted by dipping lithium electrodes into 1,3-Dioxolane prior to assembly into an electrochemical cell. The lithium electrodes my be dipped for a period of 0.5 to 2 minutes, for example, prior to assembly into a cell. The dioxolane bath may or may not contain other solvents, such as DME or other ethers, and/or lithium salts, such as LiI, LiBr, $LiClO_4$, etc. In situ treatment occurs upon contact of a lithium electrode with an electrolyte containing a dioxolane co-solvent, such as described above.

It should be noted that both pretreatment and in situ treatment of lithium electrodes in accordance with the present invention is effective with "dirty" lithium, that is, lithium whose surface is contaminated with reaction products, such as LiOH, LiN$_3$, Li$_2$O, Li$_2$CO$_3$, etc.

Battery Cells

The present invention provides battery cells containing dioxolane as a protector for lithium electrodes in accordance with the present invention. Suitable batteries may be constructed according to the known art for assembling cell components and cells as desired, and any of the known configurations may be fabricated utilizing the invention. The exact structures will depend primarily upon the intended use of the battery unit. Examples include thin film with porous separator, thin film polymeric laminate, jelly roll (i.e., spirally wound), prismatic, coin cell, etc.

For example, battery cells containing dioxolane as a protector for lithium electrodes can be constructed, with the modifications to the lithium electrode fabrication and/or electrolyte formulation described above, according to conventional formats as described in the literature, for example, De Jonghe et al., U.S. Pat. No. 4,833,048 and Visco et al., U.S. Pat. No. 5,162,175. Formats described in U.S. application Ser. No. 09/148,024, now U.S. Pat. No. 6,017,651, U.S. application Ser. Nos. 09/145,484, and 09/145,401 which describe alternate positive electrode compositions and electrode coatings may also be adapted to the present invention. All such formats are incorporated herein by reference.

In a preferred embodiment, a battery cell in accordance with the present invention may be a primary cell or a secondary cell. The battery cell includes a negative lithium electrode. The lithium electrode may be composed substantially entirely of lithium metal, a lithium alloy, or a lithium insertion compound (e.g., a lithiated-carbon electrode), or it may include one or more other materials with lithium at at least a portion of its surface. The lithium electrode may be treated with dioxolane, as described above, or may be untreated.

The battery cell also includes a positive electrode, preferably composed of an electrochemically active material including sulfur in the form of at least one of elemental sulfur, a metal sulfide, a metal polysulfide, and combinations thereof, wherein the metal is selected from the group consisting of alkali metals, alkaline earth metals, and mixtures of alkali and alkaline earth metals. In a particularly preferred embodiment, the positive electrode comprises Li$_2$S$_n$, where n=6 to 12, more preferably 8. The positive electrode may also include an organosulfur material, such as described in U.S. Pat. No. 4,833,048, incorporated by reference herein.

The cell's electrolyte is composed of at least two components: a main solvent having the chemical formula R$_1$(CH$_2$CH$_2$O)$_n$R$_2$, where n ranges between 1 and 10, R$_1$ and R$_2$ are different or identical groups selected from the group consisting of alkyl, alkoxy, substituted alkyl, and substituted alkoxy groups; and a co-solvent of dioxolane. The dioxolane co-solvent makes up no more than about 30% by volume of the electrolyte, more preferably about 5–15% by volume of the electrolyte, most preferably about 10% by volume of the electrolyte.

As described above, the electrolyte may also contain other elements, such as an additional co-solvent having a high donor number (at least about 13), such as DMF, or electrolyte salts, such as LiAsF$_6$ or LiN(CF$_3$SO$_2$)$_2$. The electrolyte may be in a liquid, gel or solid state.

In alternative embodiments, battery cells in accordance with the present invention may also include a dioxolane-treated lithium electrode and an electrolyte which does not contain dioxolane.

Figure 2:
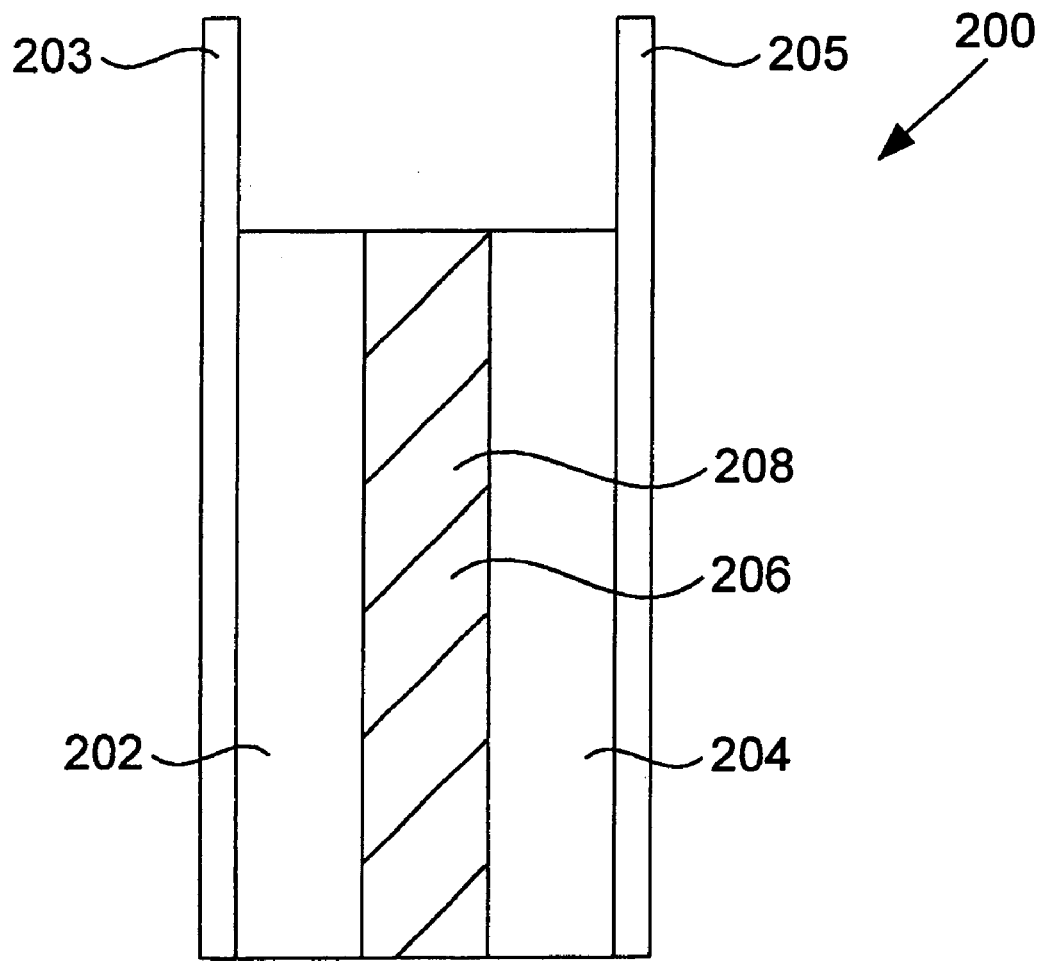
FIG. 2 schematically illustrates a simplified hypothetical battery cell in accordance with a preferred embodiment of the present invention.

FIG. 2 schematically illustrates a simplified hypothetical battery cell in accordance with the present invention. The cell 200 includes a lithium negative electrode 202 with an attached current collector 203, a porous carbon positive electrode 204 with an attached current 205, and a liquid catholyte composed of 0.5 M LiN(CF$_3$SO$_2$)$_2$ and 7.5 M Li$_2$S$_8$ dissolved in a mixture of 90 vol. % DME and 10 vol. % 1,3-Dioxolane 206. The electrodes 202 and 204 are separated by a conventional separator material 208, such as a micro-porous polymer (e.g., Celgard 2400, Hoechst Celanese), and the cell components are hermetically sealed in a bag composed of 0.48 mil polyester (outside layer)/0.28 mil aluminum/0.6 mil nylon/ 3 mil polyethylene (inner heat seal layer), such as manufactured by Fres-co Systems USA Inc., Teleford, Pa.

EXAMPLES

Various experiments were conducted to demonstrate the performance advantages provided by the various aspects of this invention. It should be understood that the experiments described in the following examples are representative only and in no way limit the scope of the present invention. The experiments are provided mainly to show the high level of performance that can be attained when following the guidelines presented herein.

Example 1

Cell Design and Assembly

A two-electrode electrochemical cell was constructed containing a Li metal anode, a porous carbon (C) cathode, and an electrolyte solution (catholyte) containing dissolved sulfur as lithium polysulfide Li$_2$S$_8$.

A cathode was made by impregnating a slurry containing carbon black into a carbon fiber paper (Lydall Technical Papers, Rochester, N.Y.). The slurry composition was 70 (wt) % carbon black, 25% polyethylene oxide (PEO, MW=900 k) and 5% Brij dissolved in acetonitrile. The resulting cathode weighed about 0.0030 gm/cm$^2$ and was vacuum dried overnight prior to transfer into an argon glovebox for final cell assembly.

The separator was a micro-porous polymeric layer having a nominal thickness of 25 microns (Hoechst Celanese, Celgard 2400). The porous separator was vacuum dried overnight prior to transfer into an argon glovebox.

230 microliters of the catholyte were placed on the cathode followed by placement of the microporous separator on the cathode. An additional 20 microliters of catholyte were then placed on the micro-porous separator. A 125 micron thick high purity lithium anode foil (Cypress Foote Mineral Co.) was then placed on the other side of the microporous separator layer. Once assembled, the cell was compressed at 2 psi.

Catholyte Preparation

All catholytes were prepared using the following method. First of all the stock solutions of Li$_2$S$_8$ dissolved in 1,2-dimethoxyethane (DME) or tetraethylene glycol dimethyl ether (tetraglyme) were prepared by dissolution of stoichiometric amounts of Li$_2$S and S in DME or tetraglyme at room temperature. The desired catholytes were prepared by addition of appropriate amounts of 1,3-dioxolane (DIOX) and supporting ionic salts to the stock solution, followed by stirring. A supporting salt, Li(CF$_3$SO$_2$)$_2$N—lithium trifluoromethanesulfonimide (LiTFSI), was used at a concentration of 0.5 mole per liter of solution.

Some of the lithium foil electrodes (125 μm as described above) were also pretreated with DIOX prior to assembly into an electrochemical cell. The lithium electrodes were dipped into a beaker of DIOX for a period of 0.5 to 2 minutes prior to assembly into a cell.

Charge-Discharge Cycling

Figure 3:
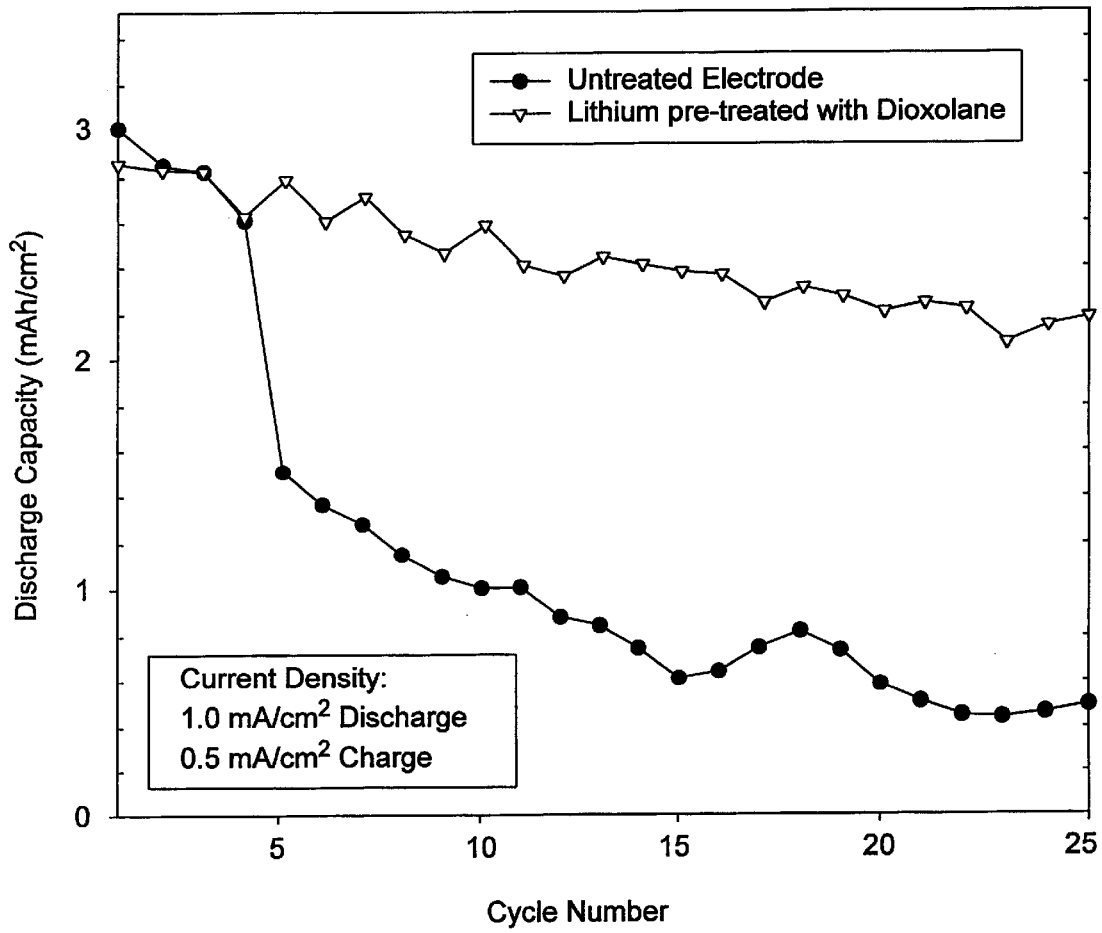
FIG. 3 depicts a discharge capacity vs. cycle number plot showing the cycle performance of untreated and pretreated lithium electrodes.

The cells were then evaluated at 25° C. with a Series 4000 battery test system from Maccor Inc. of Tulsa, Okla. In FIG. 3, the effect of electrode pretreatment can be seen. The cells were discharged at a current density of 1.0 mA/cm$^2$ to a voltage cutoff of 1.8 volts and charged at a current density of 0.5 mA/cm$^2$ to 120% of the discharge capacity or to a cutoff of 2.8 volts. The discharge capacity in milli-amphours (mAh) of the test cells is plotted vs. the number of discharge/charge cycles. It can be seen in FIG. 3 that the discharge capacity drops dramatically after the fourth cycle for the cell with no pre-treatment and no DIOX additive in the catholyte, fading to 17% of the initial capacity by the twenty-fifth cycle. However, the cell having the lithium pre-treated with DIOX shows a discharge capacity in excess of 2 mAh/cm$^2$ for 25 cycles, maintaining 76% of the initial capacity after the twenty-fifth cycle.

Example 2

Figure 4:
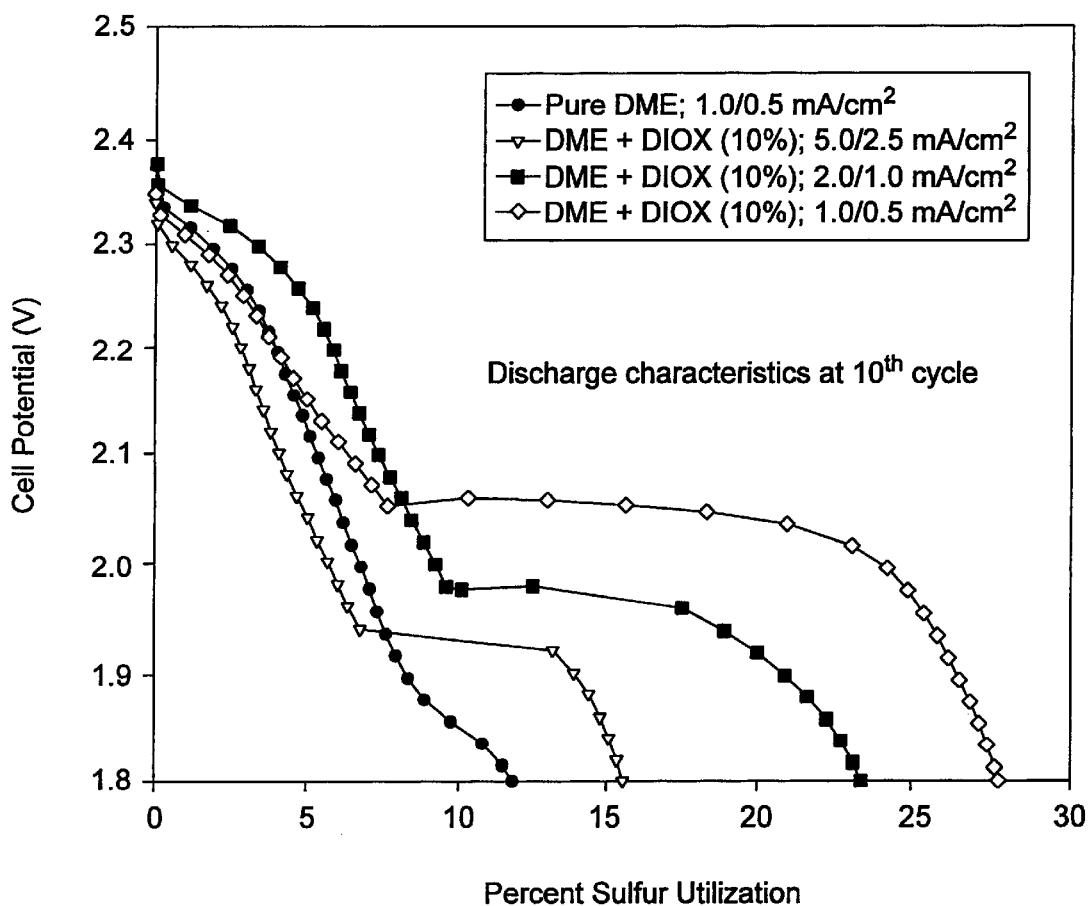
FIG. 4 depicts a cell potential vs. percent sulfur utilization plot for varying charge/discharge current densities for untreated and pretreated lithium electrodes.

Cells were assembled and tested with a Maccor battery test system as described in Example 1. The catholytes were 7.5 M in $Li_2S_8$ dissolved in pure DME or DME with 10 volume % DIOX. The tenth discharge of the cells is shown in FIG. 2 for varying charge/discharge current densities. As can be seen in FIG. 4, the depth of discharge to the 1.8 volt cutoff is superior for the cells having the protective ingredient DIOX, even at current densities far in excess of that used to discharge the cell with pure DME catholyte.

Example 3

Figure 5:
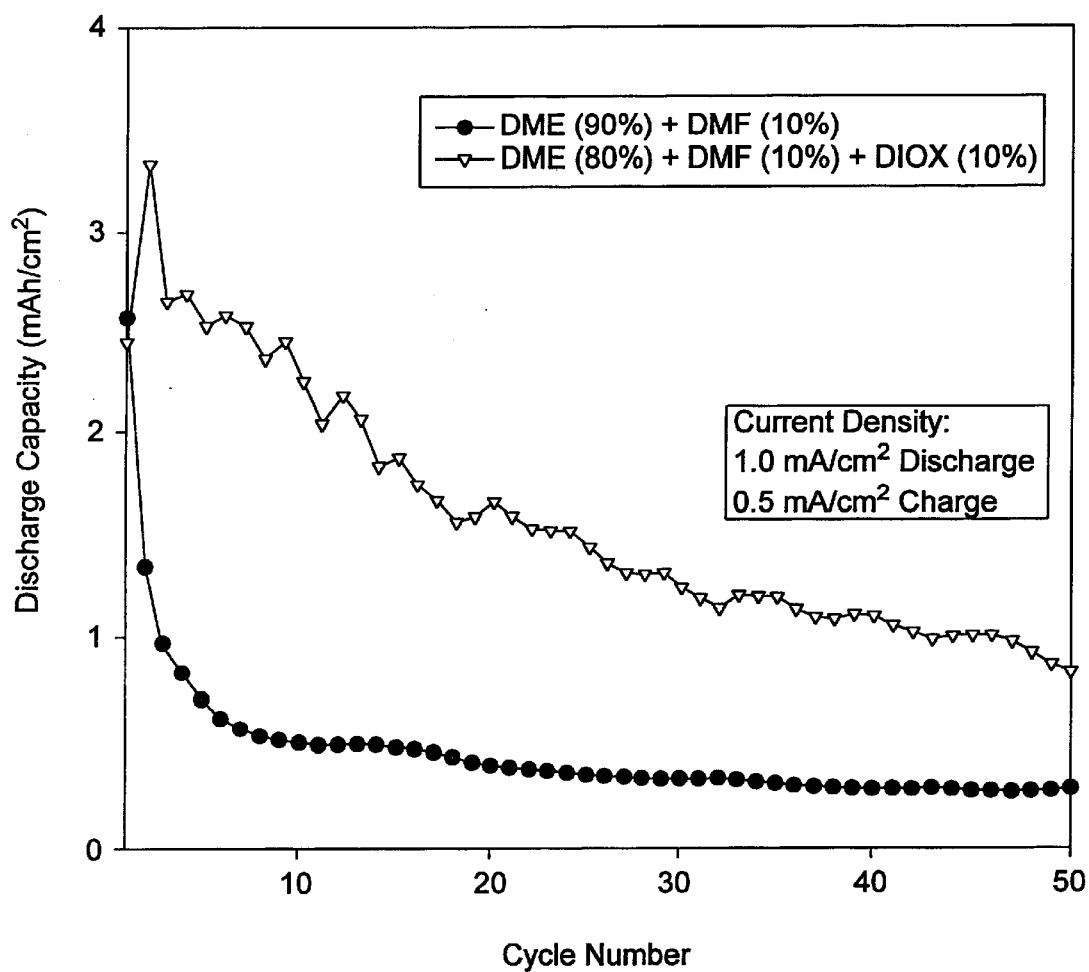
FIG. 5 depicts a discharge capacity vs. cycle number plot of the discharge profile of battery cells containing lithium electrodes with and without dioxolane in the electrolyte.

Cells were assembled and tested as described in Example 1. The catholyte was comprised of 90 vol. % DME+10 vol. % Dimethylformamide (DMF), or 80 vol. % DME+10 vol. % DMF+10 vol. % DIOX. Although the addition of DMF is intended to improve the performance of the positive electrode, DMF can attack the lithium electrode. Consequently, DIOX was used to protect the lithium electrode from the DMF. As can be seen from FIG. 5, the cell having DIOX in the catholyte exhibits better cycle performance, and retains 34% of initial capacity after 50 charge/discharge cycles. The cell having DMF but no DIOX exhibits rapid capacity fade to 38% of initial by the third discharge cycle, and by the fiffieth cycle exhibits only 10% of the initial capacity.

Example 4

A three-electrode cell for Li cycling efficiency determination was similar to the two-electrode cell described in Example 1. It was equipped with a Li reference electrode (Li wire) placed between two layers of the separator. The anode was made from Li foil 24 um thick on a Cu substrate. This cell contained more catholyte than two-electrode cell. Additional 30 microliters of catholyte were placed on the second separator layer located next to the lithium anode.

The lithium electrode was cycled galvanostatically using the Maccor battery tester such that the charge stripped and charge plated were 1 mAh/cm$^2$. From the number of cycles n required to deplete the Li foil, the average efficiency per cycle X was calculated using the Formula (1):

$$X = \frac{Q_s - (Q_f / n)}{Q_s}$$

where $Q_s$ is the charge stripped (1 mAh/cm$^2$) and $Q_f$ is the total capacity of the Li foil (determined separately by completely stripping the Li at a current density of 0.5 mA/cm$^2$). The potential of the Li electrode was continuously recorded during cycling and compared against a Li reference electrode. The discharge process was interrupted when the working electrode potential exceeded 1.75 volts vs. the Li reference electrode. Such a change in potential indicated that the Li had been completely stripped.

Figure 6A:
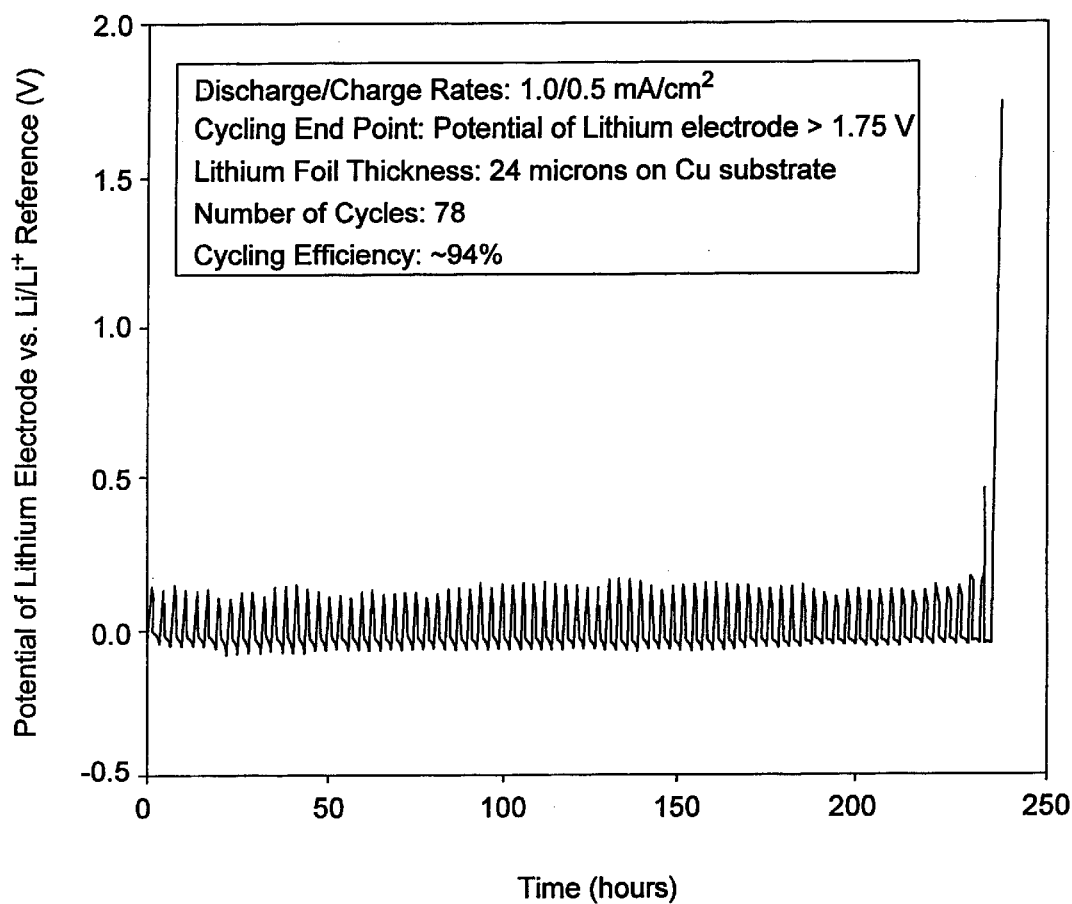
FIG. 6A depicts the potential of the lithium electrode vs. $Li/Li^+$ reference electrode vs. time plot showing the cycling efficiency of a lithium electrode in a cell having a catholyte containing DME and dioxolane in accordance with a preferred embodiment of the present invention.

As can be seen in FIG. 6A, the cycling efficiency of a cell having a catholyte containing DME+DIOX attained a high cycling efficiency of 94%. The cycling efficiency for a cell operating under the same conditions and having a catholyte containing DME without protective DIOX is only 83% efficient.

Figure 6B:
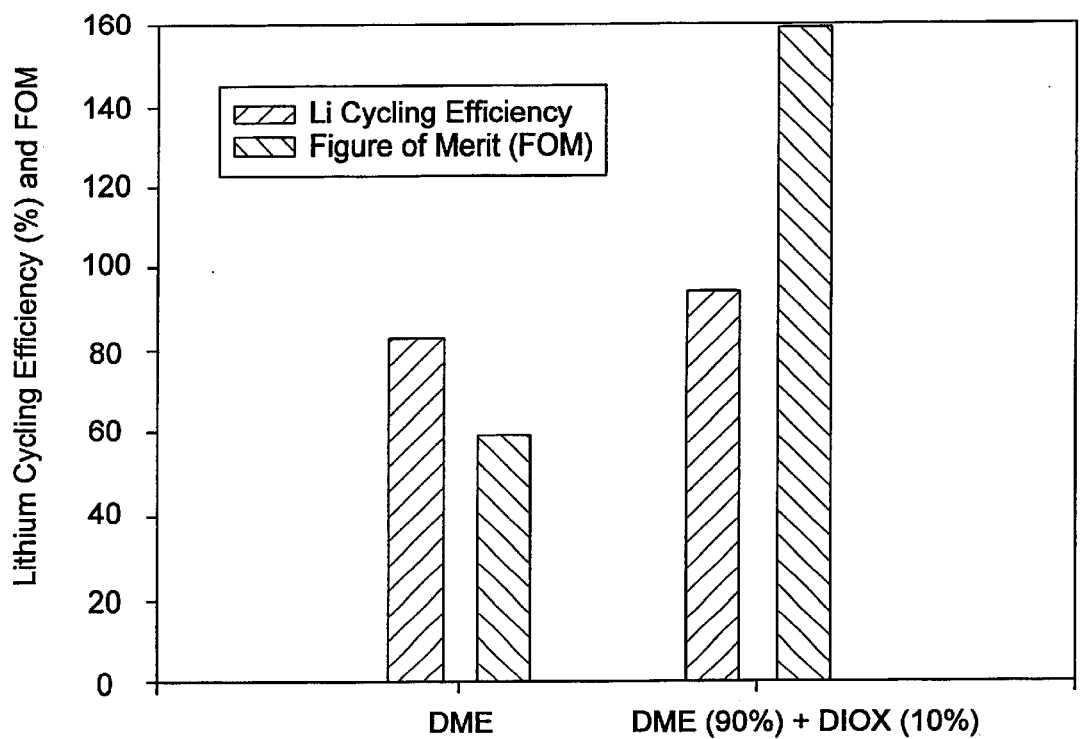
FIG. 6B depicts a bar graph plot showing the lithium cycling efficiency and figure of merit of cells having a catholyte containing DME with and without dioxolane.

In FIG. 6B, the cycling efficiency and figure of merit are shown for cells with and without DIOX. Figure of merit is calculated as:

$$FOM = \frac{100}{100 - \text{cycling efficiency (\%)}}$$

As can be seen in FIG. 6B, there is a dramatic increase in the figure of merit and cycling efficiency for the cell having DIOX in the catholyte.

Example 5

Figure 7:
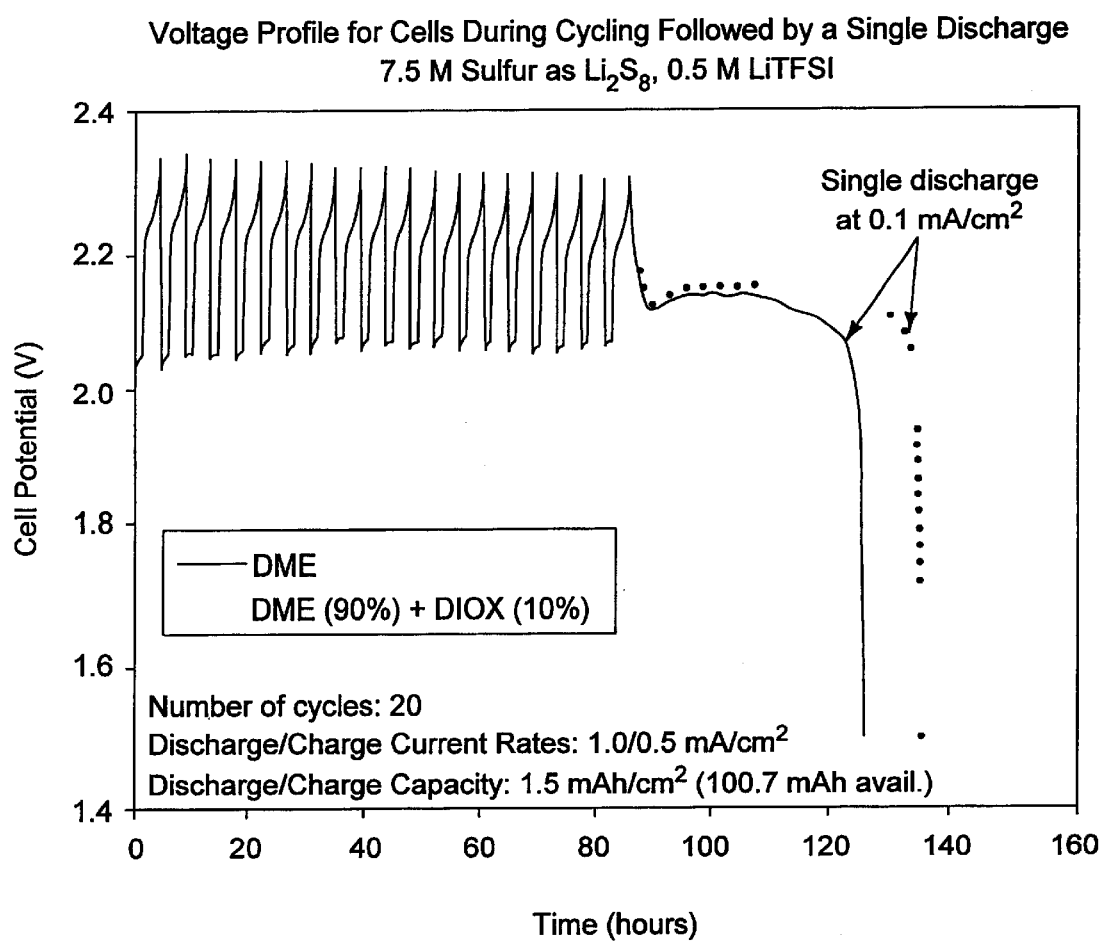
FIG. 7 depicts a cell potential vs. time plot showing the voltage profile during cycling followed by a single discharge for battery cells with and without dioxolane.

Cells were assembled as described in Example 1. The cells were cycled 20 times at a discharge rate of 1.0 mA/cm$^2$ and a charge rate of 0.5 mA/cm$^2$ to a capacity of 1.5 mAh/cm$^2$ and subsequently discharged to a voltage cutoff of 1.5 volts. As can be seen in FIG. 7 the cell having DIOX exhibited significantly more capacity after cycling than the cell without DIOX.

Example 6

Figure 8:
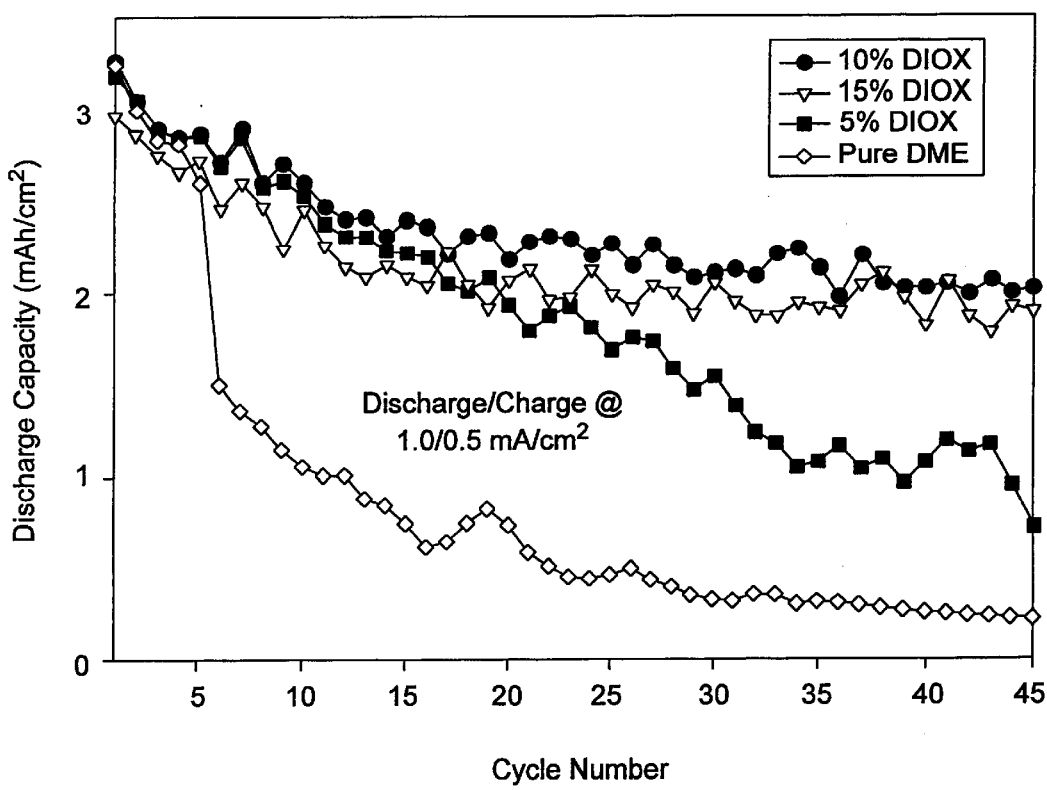
FIG. 8 depicts a discharge capacity vs. cycle number plot of the discharge profile of battery cells containing lithium electrodes with varying amounts of dioxolane and without dioxolane in the electrolyte.

Cells were assembled and tested as described in Example 1. The cells were assembled with catholytes having varying concentrations of DIOX and DME. As can be seen from FIG. 8, discharge capacity vs. cycle number improves with increasing DIOX concentration from 5% DIOX to 10% DIOX. At 15% DIOX concentration the performance is slightly worse than for 10% DIOX.

Example 7

Figure 9:
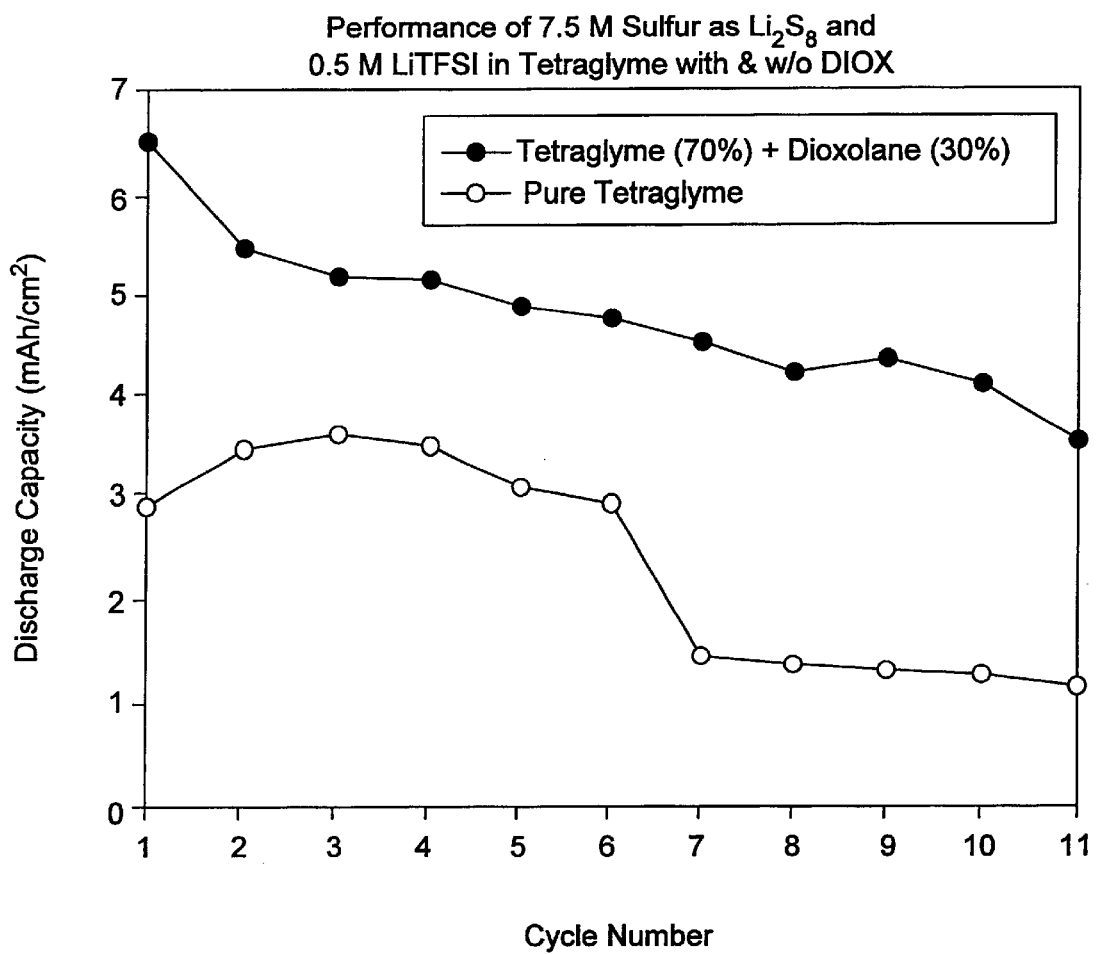
FIG. 9 depicts a discharge capacity vs. cycle number plot of the discharge profile of battery cells containing lithium electrodes and electrolytes with tetraglyme and with and without dioxolane.

Cells were assembled and tested as described in Example 1. The discharge capacity vs. cycle number is much improved for cells having catholyte including tetraglyme+ DIOX with respect to cells having tetraglyme without DIOX. As can be seen from FIG. 9, the cell having tetraglyme+DIOX exhibits much higher capacity than the cell without DIOX over the 11 cycles shown. The cell with DIOX exhibits a high initial capacity of 6.5 mAh/cm$^2$ fading to 54% of initial capacity at the eleventh cycle while the cell without DIOX shows a low initial capacity of 2.9 mAh/cm$^2$ fading to 40% of initial capacity after 11 cycles.

Example 8

Figure 10:
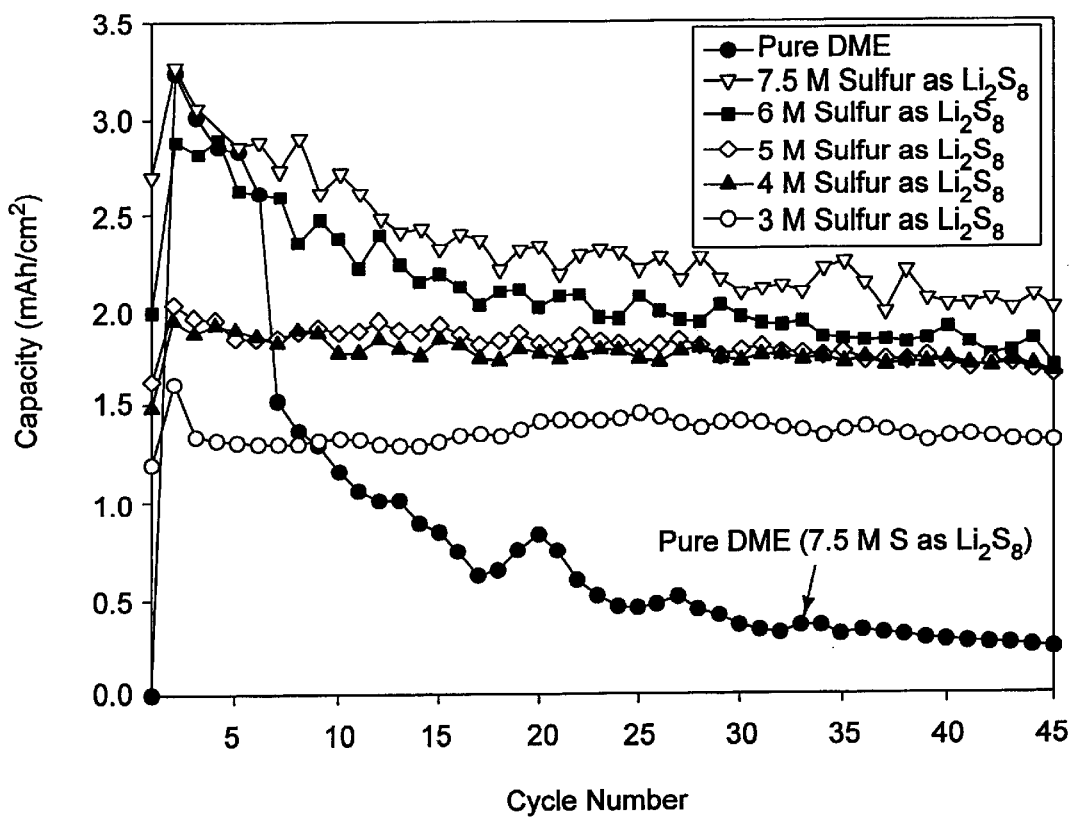
FIG. 10 depicts a capacity vs. cycle number plot of battery cells containing lithium electrodes and electrolytes without dioxolane and with dioxolane and various concentrations of $Li_2S_8$.

Cells were assembled and tested as described in Example 1. Catholytes were prepared with varying concentration of sulfur as $Li_2S_8$ in DME (90%)+DIOX (10%) up to a maximum of 7.5 M, as well as 7.5 M sulfur as $Li_2S_8$ in pure DME. As can be seen in FIG. 10, at all $Li_2S_8$ molarities, cells having 10% DIOX co-solvent performed better than the cell with pure DME solvent. Even the cell having the lowest sulfur molarity, 3 M sulfur as $Li_2S_8$ in DME (90%)+DIOX (10%), delivered larger capacity than the cell with 7.5 M sulfur as $Li_2S_8$ after the tenth cycle.

Example 9

Figure 11A:
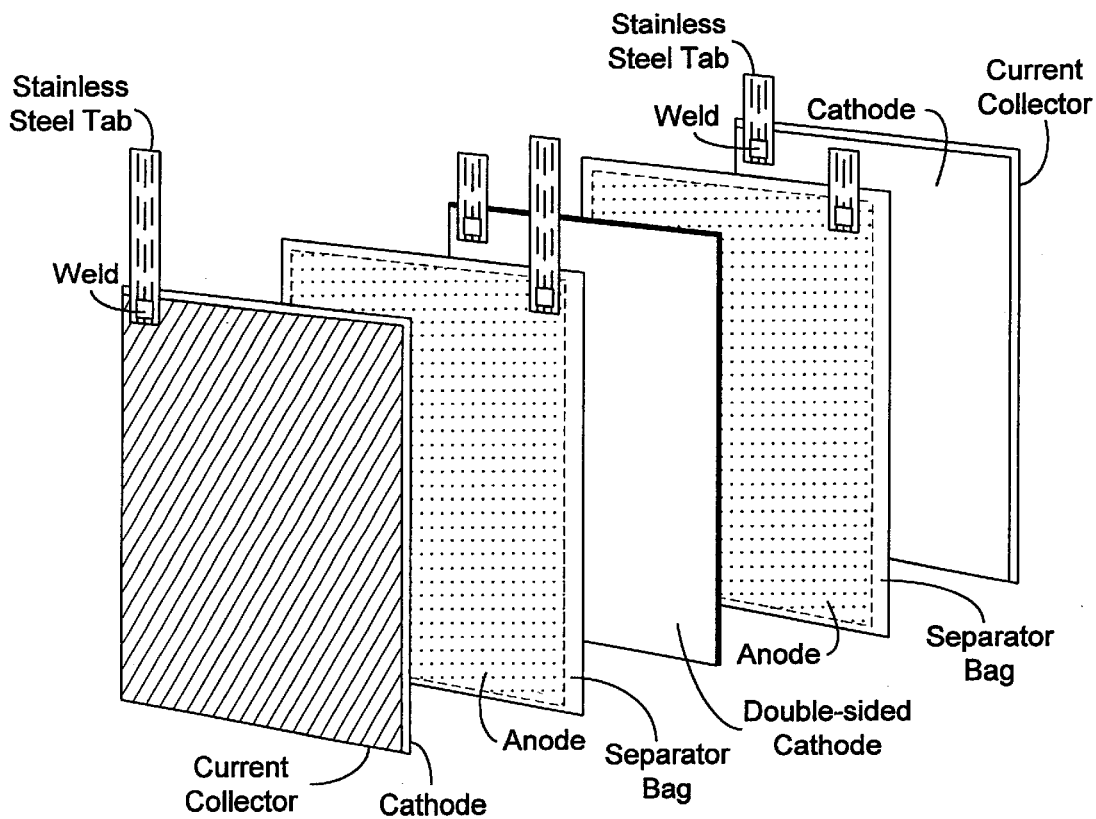
FIGS. 11A and 11B depict the components and construction of sealed evaluation cells used in the experiments of Example 9.
Figure 11B:
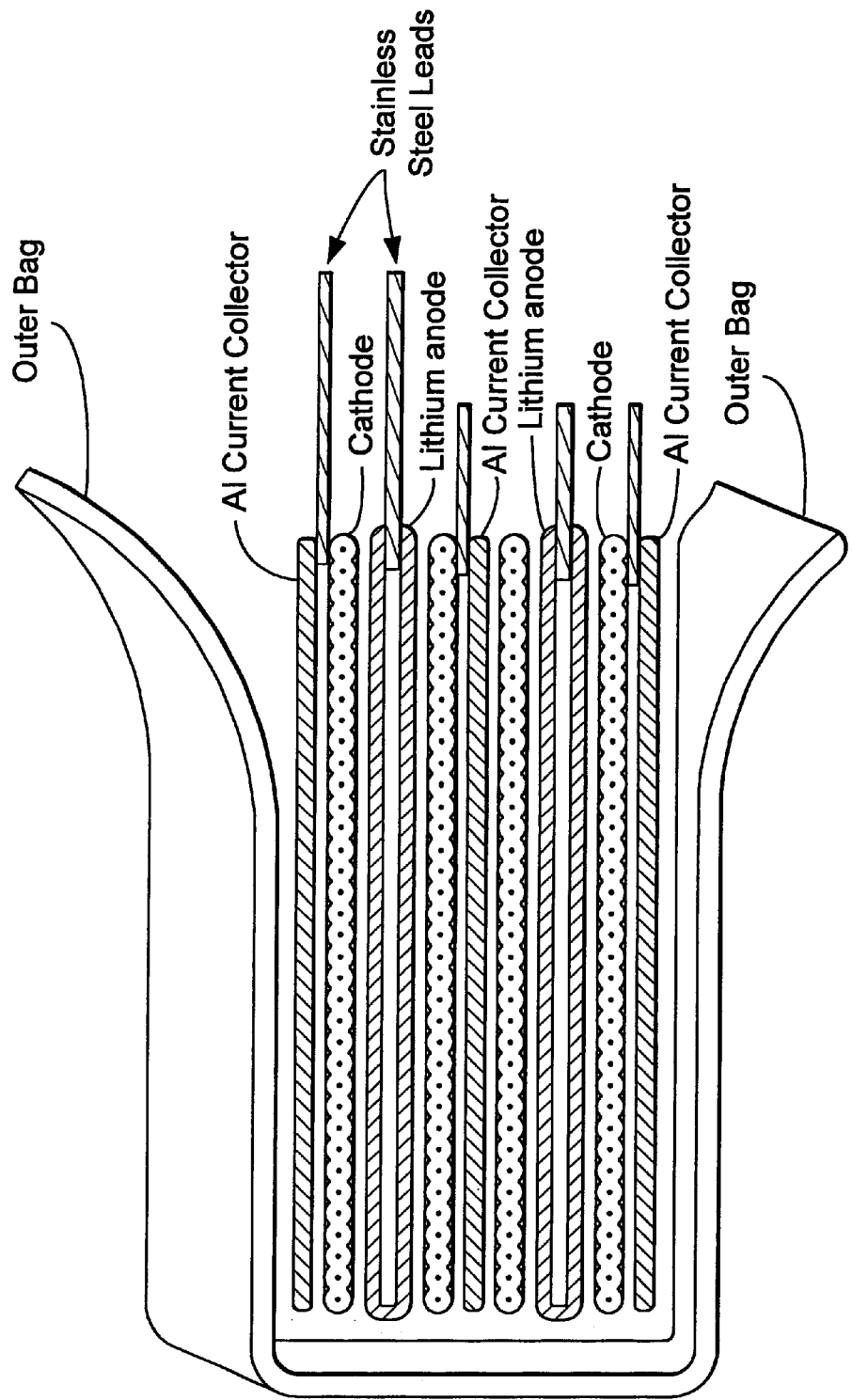

Sealed evaluation cells were constructed as shown in FIGS. 11A and 11B. As shown in the figures, the cells were hermetically sealed, and therefore any internal gas evolution could be observed as bulging or "pillowing" of the cell structure.

Figure 11C:
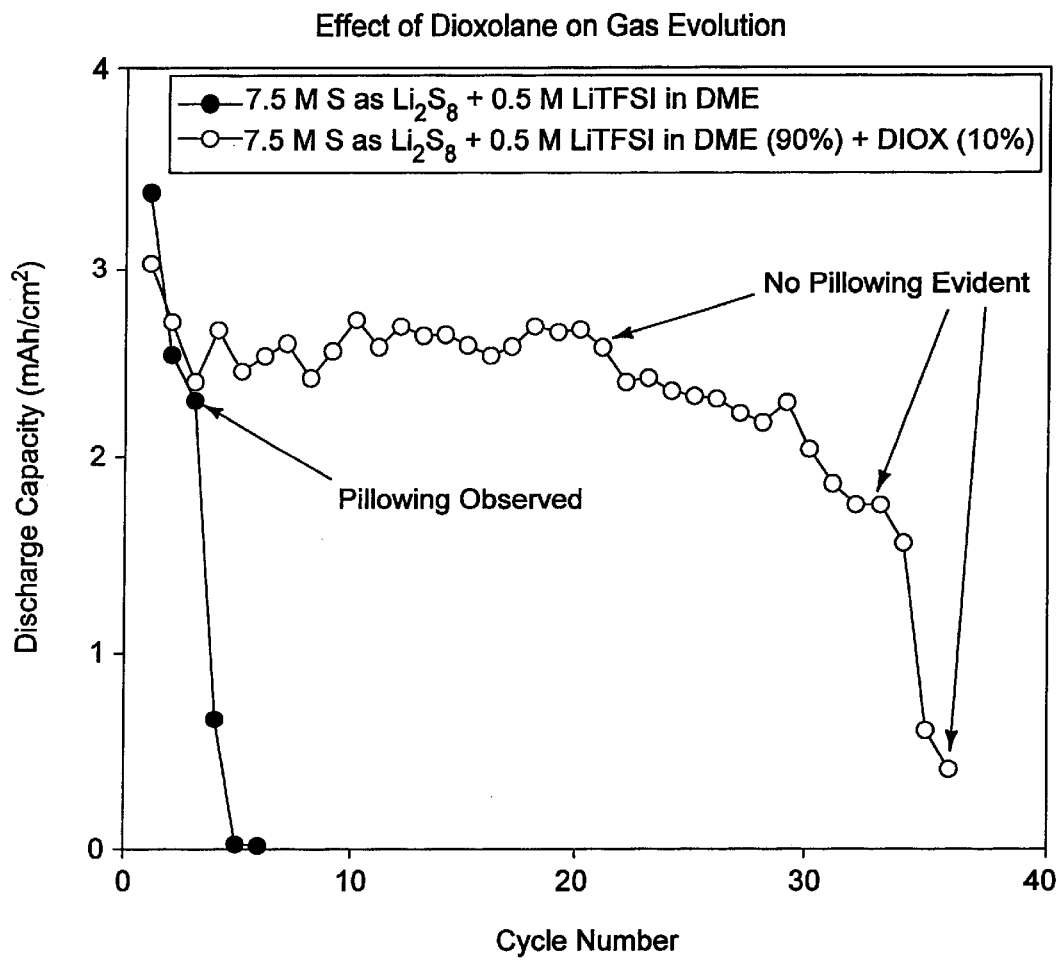
FIG. 11C depicts a discharge capacity vs. cycle number plot of the discharge profile of the battery cells depicted in FIGS. 11A and 11B showing the effects of dioxolane on gas evolution (pillowing).

One of the cells had catholyte containing 10% DIOX in 90% DME while the other cell had catholyte comprised of pure DME. The cells were cycled as described in example 1. Upon cycling the cells were monitored for visual signs of internal gas evolution that would manifest itself as pillowing of the heat-sealed bag. As can be seen in FIG. 11C, the cell containing DIOX showed no signs of pillowing even after 30 cycles. Conversely, the cell having pure DME showed rapid pressure buildup within a few cycles, and very rapid capacity fade with cycling.

Conclusion

The use of dioxolane as a protector for lithium electrodes has been described. While the present invention has been described mainly in the context of secondary battery cells, the invention is not limited to secondary batteries, but is applicable to any battery system using lithium electrodes, for example primary lithium-sulfur batteries. In addition, methods and compositions in accordance with the present invention, including dioxolane-pretreated electrodes and electrolytes containing dioxolane as a co-solvent, may be used in conjunction with other lithium-sulfur battery cells and fabrication techniques. All references cited in this application are incorporated by reference for all purposes.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A battery cell electrolyte, comprising:
    a) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups;
    b) a dioxolane co-solvent, comprising no more than about 30% by volume of the electrolyte solvent mixture; and
    c) a second co-solvent having a donor number of at least about 13.

2. The electrolyte of claim 1, wherein said dioxolane co-solvent comprises between about 5–15% by volume of the electrolyte solvent mixture.

3. The electrolyte of claim 1, wherein said dioxolane co-solvent comprises about 10% by volume of the electrolyte solvent mixture.

4. The electrolyte of claim 1, wherein said main solvent is dimethoxyethane.

5. The electrolyte of claim 1, wherein said second co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate N,N,N',N'-tetraethylsulfamide, tetramethylenediamime, tetramethylpropylenediamine, and pentamethyldiethylenetriamine.

6. The electrolyte of claim 1, further comprising an electrolyte salt.

7. The electrolyte of claim 6, wherein said electrolyte salt is at least one of $LiN(CF_3SO_2)_2$, $LiCF_3SO_3$, $LiClO_4$, $LiPF_6$, $LiBF_4$, $LiAsF_6$.

8. The electrolyte of claim 1, wherein said electrolyte is in a liquid state.

9. A batters cell electrolyte, comprising:
    a) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups;
    b) a dioxolane co-solvent, comprising no more than about 30% by volume of the electrolyte solvent mixture wherein said electrolyte is in a gel state.

10. A battery cell electrolyte, comprising:
    a) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups;
    b) a dioxolane co-solvent, comprising no more than about 30% by volume of the electrolyte solvent mixture wherein said electrolyte is in a solid state.

11. A battery cell electrolyte, comprising:
    a) a main solvent having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups;
    b) a first co-solvent comprising dioxolane; and
    c) a second co-solvent having a donor number of at least about 13.

12. The electrolyte of claim 11, wherein said second co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate N,N,N',N'-tetraethylsulfamide, tetramiethylenediamine, tetramethylpropylenediamine, and pentamethyldiethylenetriamine.

13. The electrolyte of claim 11, further comprising an electrolyte salt.

14. The electrolyte of claim 13, wherein said electrolyte salt is at least one of $LiN(CF_3SO_2)_2$, $LiCF_3SO_3$, $LiClO_4$, $LiPF_6$, $LiBF_4$, $LiAsF_6$.

15. A negative electrode, comprising:
    a) a lithium material; and
    b) a dioxolane-based film coating said lithium material, said film formed by treating said lithium material with dioxolane;
    wherein said electrode is outside a battery cell.

16. The electrode of claim 15, wherein said lithium material is comprised of at least one of lithium metal, a lithium alloy, and a lithium insertion compound.

17. A battery cell comprising:
a) a negative lithium electrode;
b) a positive electrode comprising an electrochemically active material;
c) an electrolyte including a
  i) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups;
  ii) a dioxolane co-solvent, comprising no more than 30% by volume of the electrolyte solvent mixture; and
  iii) a second co-solvent having a donor number of at least about 13.

18. The battery cell of claim 17, wherein said electrochemically active material comprises sulfur in the form of at least one of elemental sulfur, a metal sulfide, a metal polysulfide, an organosulfur material, and combinations thereof, wherein said metal is selected from the group consisting of alkali metals, alkaline earth metals, and mixtures of alkali and alkaline earth metals.

19. The battery cell of claim 18, wherein said electrochemically active material comprises $Li_2S_8$.

20. The battery cell of claim 17, wherein said second co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate N,N,N',N'-tetraethylsulfamide, tetramethylenediamine, tetramethylpropylenediamine, and pentamethyldiethylenetriamine.

21. The battery cell of claim 17, further comprising an electrolyte salt.

22. The battery cell of claim 21, wherein said electrolyte salt is at least one of $LiN(CF_3SO_2)_2$, $LiCF_3SO_3$, $LiClO_4$, $LiPF_6$, $LiBF_4$, $LiAsF_6$.

23. The battery cell of claim 17, wherein said electrolyte is in a liquid state.

24. A battery cell comprising:
b) a negative lithium electrode;
b) a positive electrode comprising an electrochemically active material;
c) an electrolyte including a
  i) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups; and
  ii) a dioxolane co-solvent comprising no more than 30% by volume of the electrolyte solvent mixture wherein said electrolyte is in a gel state.

25. A batters cell comprising:
c) a negative lithium electrode;
b) a positive electrode comprising an electrochemically active material;
c) an electrolyte including a
  i) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups; and
  ii) a dioxolane co-solvent, comprising no more than 30% by volume of the electrolyte solvent mixture wherein said electrolyte is in a solid state.

26. The battery cell of claim 17, wherein said electrolyte is a catholyte comprising a dissolved lithium polysulfide.

27. The battery cell of claim 17, further comprising an electrolyte separator.

28. A battery cell comprising:
a) a negative lithium electrode, comprising,
  i) a lithium material, and
  ii) a film coating said lithium material, said film formed by treating said lithium material with dioxolane prior to incorporation of said electrode into a battery cell;
b) a positive electrode comprising an electrochemically active material; and
c) an electrolyte including
  i) a solvent having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups
  ii) a co-solvent having a donor number of at least about 13.

29. The battery cell of claim 28, wherein said electrochemically active material is selected from the group consisting of elemental sulfur, a metal sulfide, a metal polysulfide, an organosulfur material, and combinations thereof, wherein said metal is selected from the group consisting of alkali metals, alkaline earth metals, and mixtures of alkali and alkaline earth metals.

30. The battery cell of claim 28, wherein said electrochemically active material comprises $Li_2S_8$.

31. The battery cell of claim 28, further comprising an electrolyte separator.

32. The battery cell of claim 28, wherein said co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate N,N,N',N'-tetraethylsulfamide, tetramethylenediamine, tetramethylpropylenediamine, and pentamethyldiethylenetriamine.

33. The battery cell of claim 28, further comprising an electrolyte salt.

34. The battery cell of claim 33, wherein said electrolyte salt is at least one of $LiN(CF_3SO_2)_2$, $LiCF_3SO_3$, $LiClO_4$, $LiPF_6$, $LiBF_4$, $LiAsF_6$.

35. A method of making a protected lithium electrode battery cell, comprising:
a) treating a lithium material with dioxolane to form a negative electrode having a protective film;
b) forming a positive electrode comprising an electrochemically active material; and
c) combining said negative and positive electrodes with an electrolyte following the treating of said lithium material.

36. The method of claim 35, wherein said positive electrode comprises sulfur in the form of at least one of elemental sulfur, a metal sulfide, a metal polysulfide, an organosulfur material, and combinations thereof, wherein said metal is selected from the group consisting of alkali metals, alkaline earth metals, and mixtures of alkali and alkaline earth metals.

37. The method of claim 36, wherein said electrochemically active material comprises $Li_2S_8$.

38. The method of claim 35, further comprising interposing an electrolyte separator between said positive and negative electrodes.

* * * * *

UNITED STATES PATENT AND TRADEMARK OFFICE
CERTIFICATE OF CORRECTION

PATENT NO. : 6,225,002 B1
DATED : May 1, 2001
INVENTOR(S) : Nimon et al.

It is certified that error appears in the above-identified patent and that said Letters Patent is hereby corrected as shown below:

Title page,
In the Title, "DIOXOLANE AS A PROCTECTER FOR LITHIUM ELECTRODES". Please replace with -- DIOXOLANE AS A PROTECTOR FOR LITHIUM ELECTRODES --.

Signed and Sealed this

Twentieth Day of November, 2001

Attest:

*Nicholas P. Godici*

NICHOLAS P. GODICI
*Attesting Officer*    *Acting Director of the United States Patent and Trademark Office*